United States Patent
Cox et al.

(10) Patent No.: US 10,024,994 B1
(45) Date of Patent: Jul. 17, 2018

(54) WEARABLE MAGNETIC FIELD UTILITY LOCATOR SYSTEM WITH SOUND FIELD GENERATION

(71) Applicants: David A. Cox, San Diego, CA (US); Mark S. Olsson, La Jolla, CA (US)

(72) Inventors: David A. Cox, San Diego, CA (US); Mark S. Olsson, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 147 days.

(21) Appl. No.: 14/077,022

(22) Filed: Nov. 11, 2013

Related U.S. Application Data

(63) Continuation of application No. 13/107,607, filed on May 13, 2011, which is a continuation of application No. 11/779,412, filed on Jul. 18, 2007.

(60) Provisional application No. 60/807,701, filed on Jul. 18, 2006.

(51) Int. Cl.
  *G01V 3/10* (2006.01)

(52) U.S. Cl.
  CPC .................................. *G01V 3/104* (2013.01)

(58) Field of Classification Search
  None
  See application file for complete search history.

(56) References Cited

U.S. PATENT DOCUMENTS

| | | | |
|---|---|---|---|
| 4,112,349 A | 9/1978 | Weber | |
| 4,255,710 A | 3/1981 | Weber | |
| 5,471,143 A | 11/1995 | Doany | |
| 5,889,870 A | 3/1999 | Norris | |
| 6,140,819 A * | 10/2000 | Peterman | G01V 3/15 324/326 |
| 6,954,072 B1 * | 10/2005 | Schlapp | G01V 3/15 324/329 |
| 7,009,399 B2 * | 3/2006 | Olsson | G01V 3/15 324/326 |
| 2003/0218469 A1 * | 11/2003 | Brazell | G01V 3/15 324/637 |
| 2004/0128737 A1 * | 7/2004 | Gesten | A42B 1/245 2/171 |
| 2005/0156600 A1 * | 7/2005 | Olsson | G01V 3/15 324/329 |
| 2006/0109989 A1 | 5/2006 | Linhard | |
| 2006/0232259 A1 * | 10/2006 | Olsson | G01R 29/0871 324/67 |
| 2007/0279067 A1 * | 12/2007 | Wiswell | G01R 29/12 324/457 |

(Continued)

OTHER PUBLICATIONS

Press Release, AUDIOSPOTLIGHT, Oct. 21, 2003, Holosonic Research Labs, Inc., Watertown, Massachusetts, US. http://www.holosonics.com/PR_TR100.html.

(Continued)

*Primary Examiner* — Jerold Murphy
(74) *Attorney, Agent, or Firm* — Steven C. Tietsworth, Esq.; Heena Sharma

(57) ABSTRACT

A buried utility locator system may include a portable locator that generates audio signals representative of positional and/or depth information of the locator relative to a buried utility, along with a plurality of audio transducers and a cord or wireless transmitter for communicating the audio signals to the audio transducers for generating an audio output field providing information about the buried utility.

10 Claims, 10 Drawing Sheets

(56) References Cited

U.S. PATENT DOCUMENTS

2007/0290672 A1* 12/2007 Worsley ................ G01V 3/081
                                                                                         324/67

OTHER PUBLICATIONS

Press Release, LEMELSON-MIT, Apr. 18, 2005, MIT School of Engineering, US. http://web.mit.edu/invent/n-pressreleases/n-press-05LMP.html.

* cited by examiner

WEARABLE MAGNETIC FIELD UTILITY LOCATOR SYSTEM WITH SOUND FIELD GENERATION

CROSS-REFERENCE TO RELATED APPLICATIONS

This application is a continuation of and claims priority to co-pending U.S. patent application Ser. No. 13/107,607, entitled WEARABLE DIRECTIONAL AUDIO BURIED UTILITY LOCATOR SYSTEM, filed on May 13, 2011, which is a continuation of and claims priority to U.S. patent application Ser. No. 11/779,412, entitled WEARABLE DIRECTIONAL AUDIO BURIED UTILITY LOCATOR SYSTEM, filed on Jul. 18, 2007, which claims priority under 35 USC Sections 119(e) and 120 from U.S. Provisional Patent Application Ser. No. 60/807,701, entitled WEARABLE DIRECTIONAL AUDIO LOCATOR SYSTEM, filed Jul. 18, 2006. The content of each of these applications is hereby incorporated by reference herein in its entirety for all purposes.

FIELD

This invention relates generally to electronic systems and methods for locating buried or otherwise inaccessible pipes and other conduits, cables, conductors and inserted transmitters.

BACKGROUND

There are many situations where is it desirable to locate buried utilities such as pipes and cables. For example, prior to starting any new construction that involves excavation, it is important to locate existing underground utilities such as underground power lines, gas lines, phone lines, fiber optic cable conduits, CATV cables, sprinkler control wiring, water pipes, sewer pipes, etc., collectively and individually referred to hereinafter as "utilities" or "objects." As used herein the term "buried" refers not only to objects below the surface of the ground, but in addition, to objects located inside walls, between floors in multi-story buildings or cast into concrete slabs, etc. If a back hoe or other excavation equipment hits a high voltage line or a gas line, serious injury and property damage can result. Severing water mains and sewer lines leads to messy cleanups. The destruction of power and data cables can seriously disrupt the comfort and convenience of residents and cost businesses huge financial losses.

Buried objects can be located by sensing an electromagnetic signal emitted by the same. Some cables such as power lines are already energized and emit their own long cylindrical electromagnetic field. Location of other conductive lines necessitates their energizing with an outside electrical source having a frequency typically in a range of approximately 50 Hz to 500 kHz. Location of buried long conductors is often referred to as "line tracing."

A sonde (also called a transmitter, beacon or duct probe) typically includes a coil of wire wrapped around a ferromagnetic core. The coil is energized with a standard electrical source at a desired frequency, typically in a range of approximately 50 Hz to 500 kHz. The sonde can be attached to a push cable or line or it may be self-contained so that it can be flushed. A sonde generates a more complex electromagnetic field (dipole) than that produced by an energized line. However, a sonde can be localized to a single point. A typical low frequency sonde does not strongly couple to other objects and thereby produce complex interfering fields that can occur during the tracing. The term "buried objects" as used herein also includes sondes and buried locatable markers such as marker balls.

Some portable locators that heretofore have been developed involve various means of informing the user of the directional bias of detected conductors, such as rising and falling tones or coded beeps from a single speaker in a hand-held locator, or arrows on a locator's display panel. Such means can distract the operator's attention from his immediate environment, which can be a liability when seeking to locate cables or pipes installed in urban areas, irregular terrain, or where road traffic presents a hazard. Additionally, the operator involved in locating such hidden pipes, cables or wires requires as much of his attention as possible be free to analyze the situation around him for indications of likely dispositions of conductors (for example, the location of visible junction boxes or valve chests) as well as avoiding hazards of traffic or terrain.

SUMMARY

In accordance with an embodiment of the invention, a buried utility locator system includes a man-portable locator that generates audio signals representative of a direction of the locator relative to a buried utility, a plurality of audio transducers, and cord or wireless transmitter for communicating the direction signals to the audio transducers.

BRIEF DESCRIPTION OF THE DRAWINGS

Like reference designations represent like features throughout the several views and wherein.

DETAILED DESCRIPTION OF EMBODIMENTS

The entire disclosures of published U.S. Patent Application No. 2004/0070535 A1 entitled "Single and Multi-Trace Omnidirectional Sonde and Line Locators and Transmitter Used Therewith," filed Dec. 3, 2002, of Mark Olsson et al., and pending U.S. patent application Ser. No. 10/956,328 entitled "Multi-Sensor Mapping Omnidirectional Sonde and Line Locator," filed on Oct. 1, 2004, of Mark Olsson et al., are incorporated herein by reference. In addition, pending U.S. patent application Ser. No. 11/774,462, entitled "Mesh Networking Wireless Buried Pipe and Cable Locating System," filed Jul. 6, 2007, of Mark Olsson et al, is likewise entirely incorporated herein by reference.

The present invention extends the present art of locating hidden conductors, such as cables, pipes, or other lines, or dipole transmitters such as sondes, through the integration of directional sound signals which supplement the information available to the operator on the display of a man-portable locator.

Figure 1:
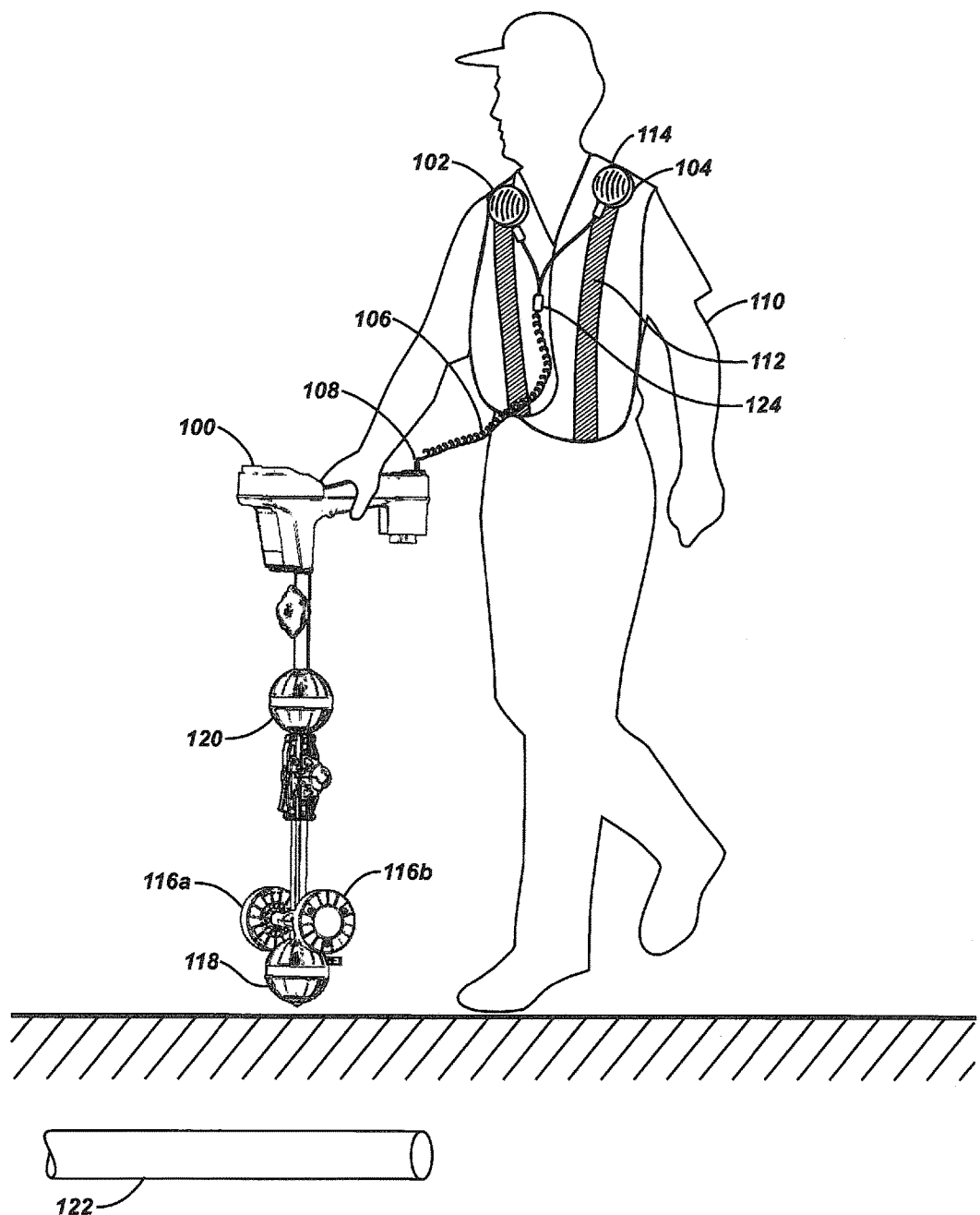
FIG. 1 illustrates the use of a locating device in conjunction with an embodiment of the present invention.

FIG. 1 illustrates an embodiment in which an operator (110) in the process of locating a buried utility (122) carries a man-portable locator (100). The locator (100) may be, for example, of the type disclosed in the U.S. patent applications incorporated above. The locator (100) is connected by a coil-cord (106) and stereo plug (108) via a Y-split lead (124) to audio transducer in the form of a right speaker (102) and left speaker (104) which are attached to the operator's garment, here a safety vest (112), by attachment means (114). Headphones or earplugs may be used in place of speakers 102 and 104. In FIG. 1, the locator senses fields indicating the location of the buried utility (122) through two omnidirectional antennas, one upper antenna array (120) and one lower antenna array (118) as well as a left gradient coil (116b) and a right gradient coil (116a).

Figure 2:
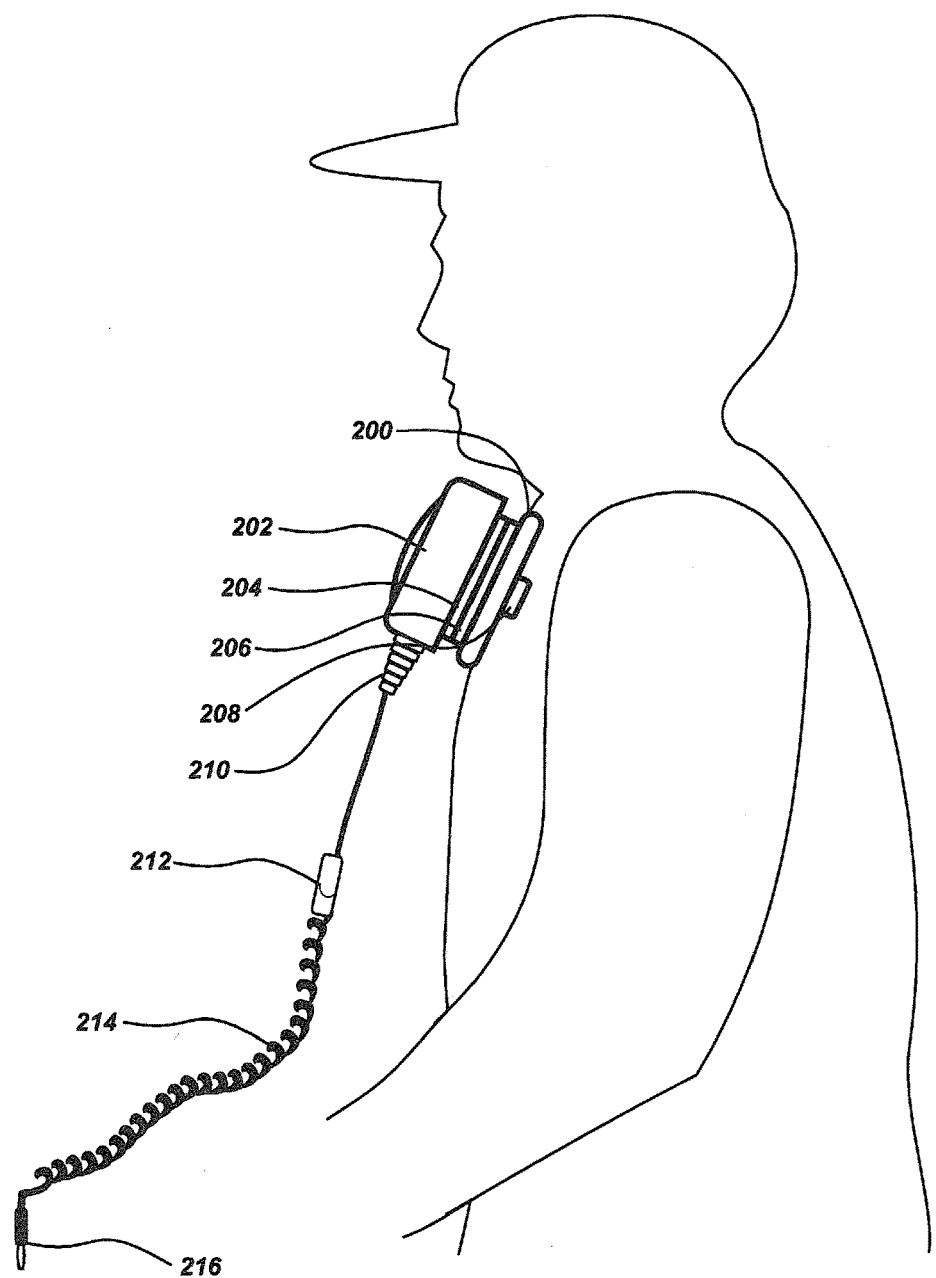
FIG. 2 illustrates a representative speaker attached at or near each shoulder of an external garment worn by an operator.

Referring to FIG. 2, a supporting button (200) is attached to a garment on an operator by means of a button pin (208), and carries Velcro loops on its outer surface (206). A speaker enclosure (202) with Velcro hooks on its inner surface (204) is mounted to the button (200) by the Velcro attachment. The speaker enclosure (202) contains the speaker elements which are connected by wires leading through a wire seal and strain relief (210) to a Y-split junction (212) and then to a coil cord (214) fitted with a stereo plug or jack (216) for attachment to the locator or other device to be used.

Figure 3:
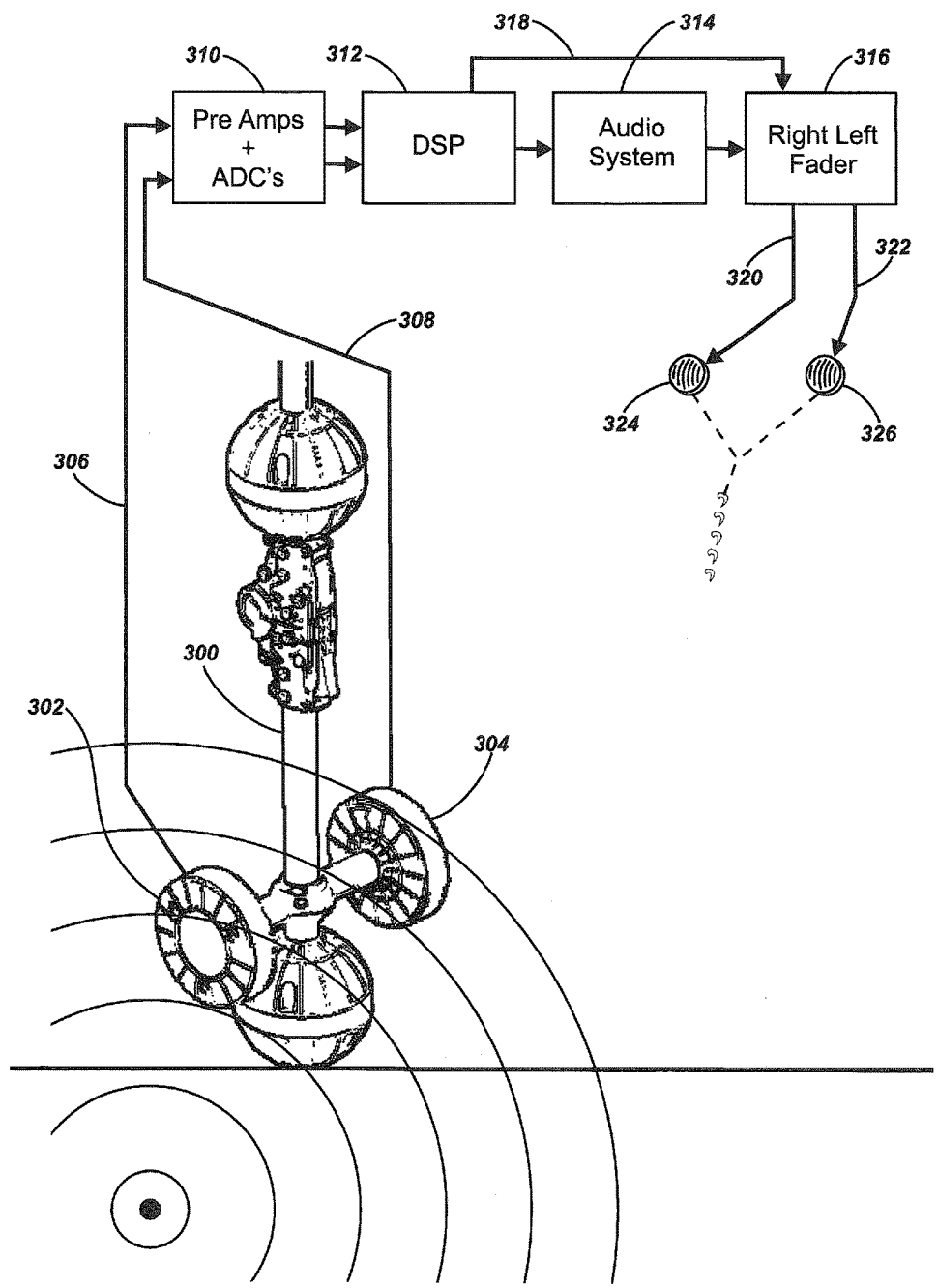
FIG. 3 is a hybrid block diagram and pictorial diagram illustrating the integration of information from the gradient coils of a locator, by means of pre-amplifier and analog-digital conversion circuits to an audio system block and left-right fader circuits which provide a composite signal to the left and right speakers illustrated in FIGS. 1 and 2.
Figure 4A:
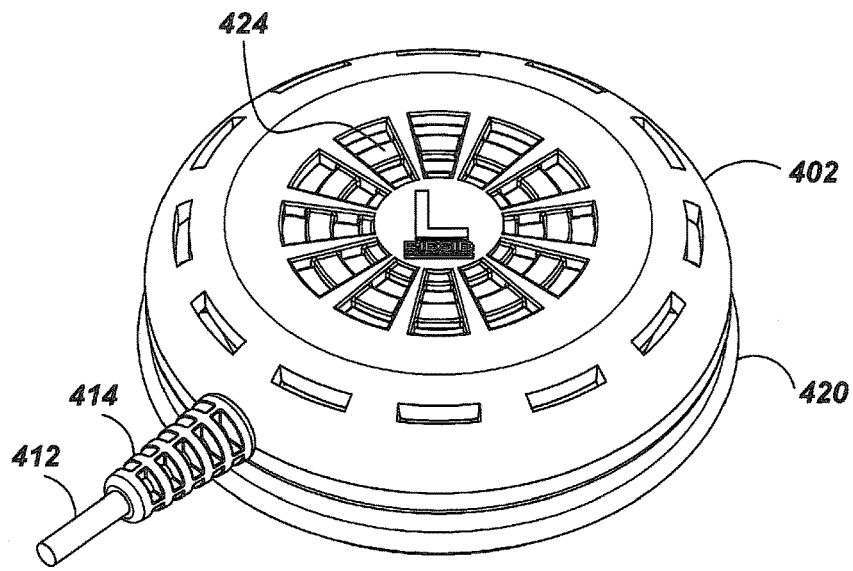
FIGS. 4A-4D illustrate the construction of the speakers and their attachment in the embodiment of FIGS. 1-3.
Figure 4B:
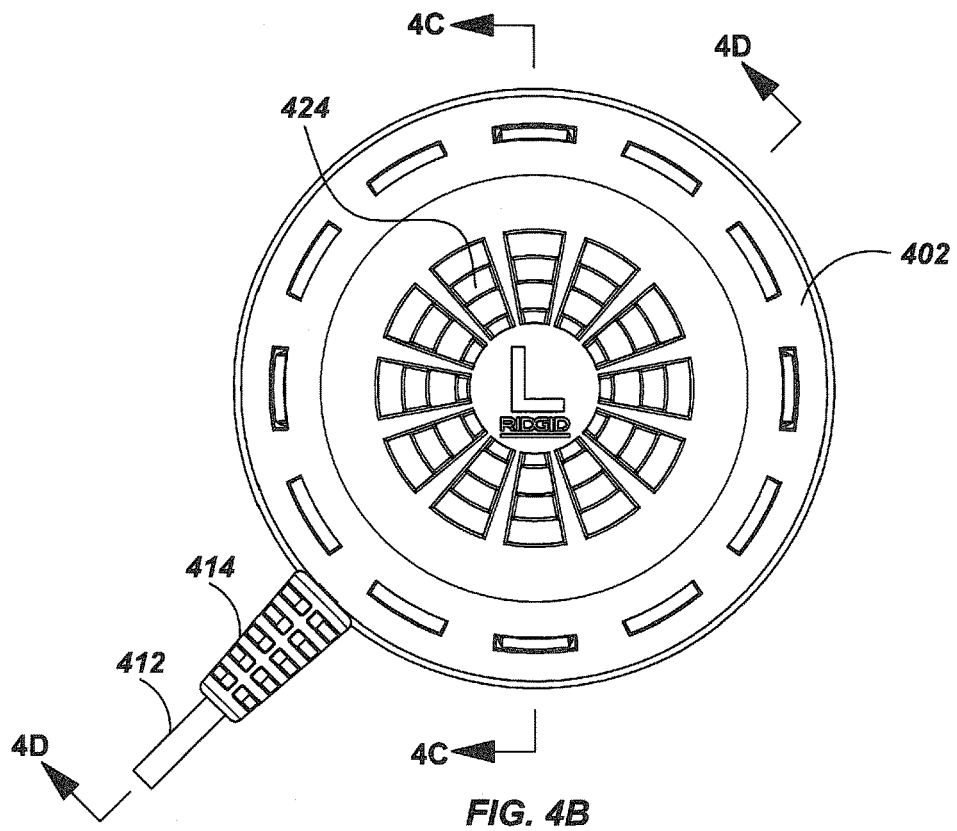
Figure 4C:
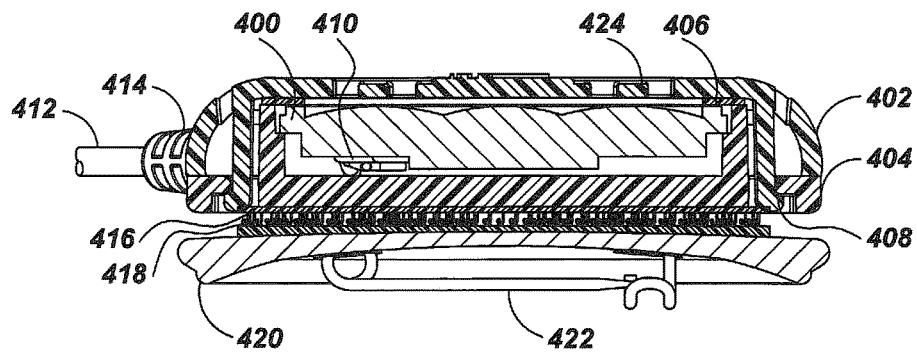
Figure 4D:
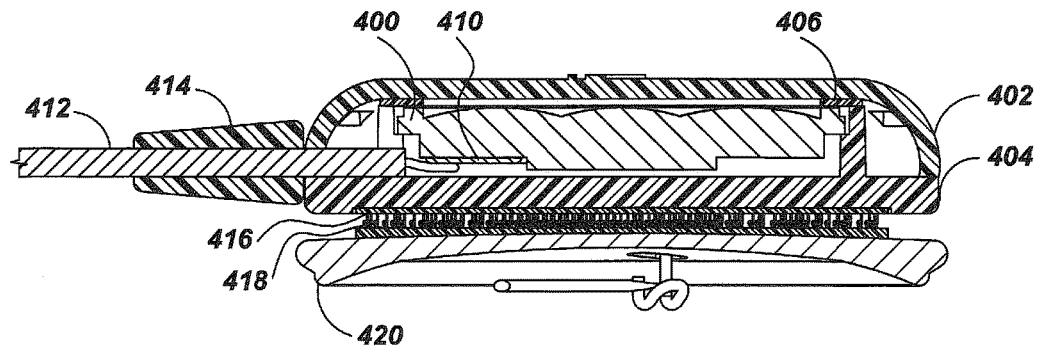

Referring to FIG. 3, a man-portable utility and Sonde locator (300) is equipped with a left gradient coil (302) and a right gradient coil (304). Detection signals from the gradient coils are routed to a pre-amp and analog-digital converter circuit (310). The digitized output is transferred to a digital signal processor or DSP (312) from which it is processed by audio system software (314) to configure the information into appropriate sound signals. The signal stream is then processed through a left-right fader (316), signals representative of the direction of the locator relative to the buried utility are generated and the appropriate channels of sound are sent to the left speaker (326) or the right speaker (324) (as viewed from the operator's perspective). A signal gradient may be used to indicate direction. A single channel of audio may be sent at different amplitudes to the different speakers. DSP (312) has a control connection (318) with the right-left fader, governing its treatment of the sound signal from the audio system (314).

Referring now to FIGS. 4A, 4B, 4C and 4D, a speaker enclosure assembly is illustrated comprising a speaker (400) contained between a top enclosure (402) and a bottom enclosure (404). An enclosure seal (406) prevents liquid or dust from entering the enclosure. A formed snap-fit (408) causes the upper and lower enclosures to join around the seal. Speaker terminals (410) are connected to a cable (412) leading via a Y-split to the locator. The cable (412) exits the enclosure by means of a cable seal and strain relief element (414). The lower enclosure (404) is equipped on its lower surface with a coin-shape Velcro hook array (416). A complementary coin-loop array (418) is attached to a pin-on button (420) backed by a button pin (422) and is used in attaching the assembly to a garment or other surface as needed. FIG. 4 illustrates a speaker grill (424) that is built into the surface of the top enclosure (402).

Figure 5A:
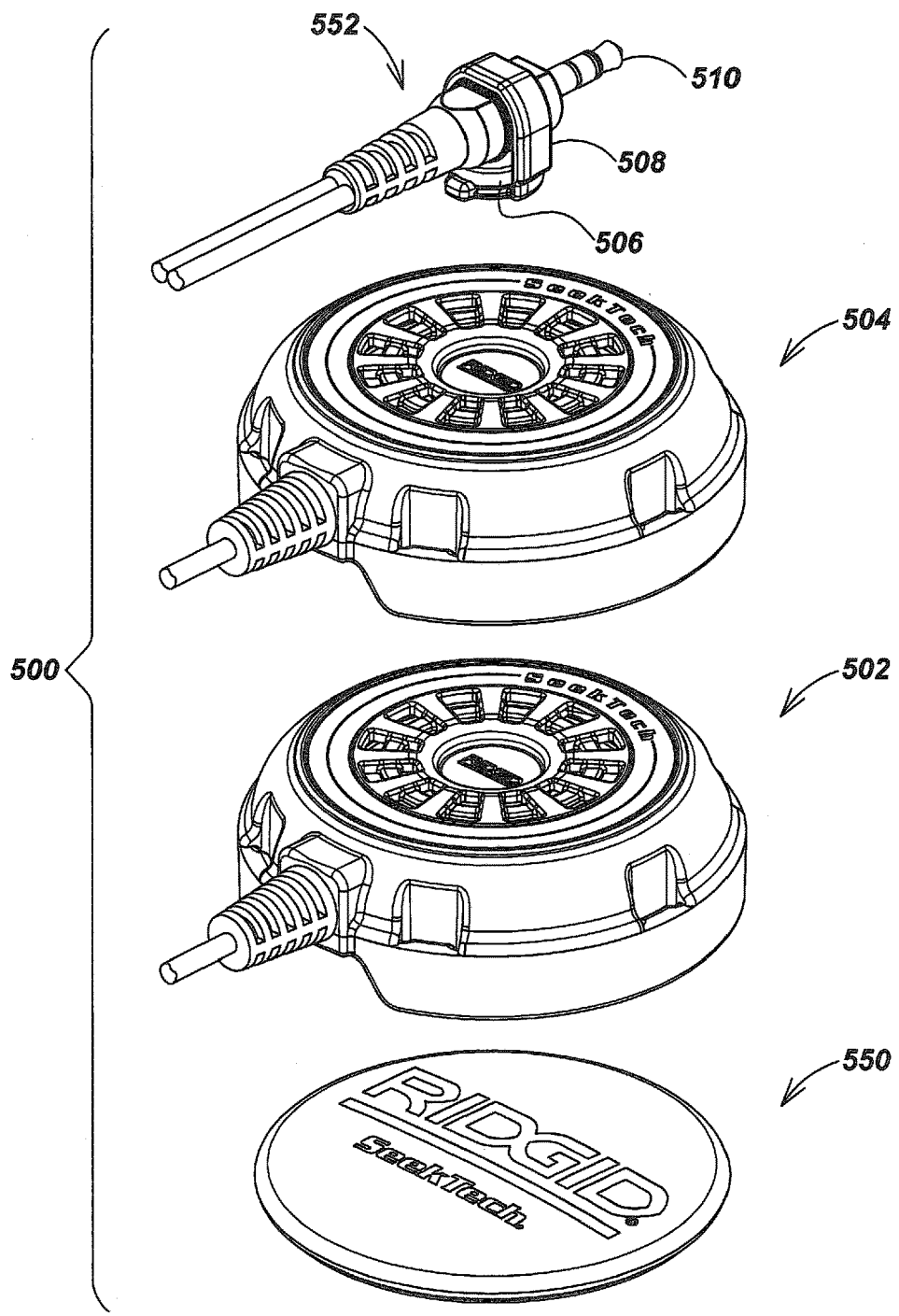
FIG. 5A illustrates the self-stacking configuration of the speakers of FIGS. 4A-4D.

Referring now to FIG. 5A, the speaker assemblies (502, 504), button assembly 550 and jack plug assembly 552 are illustrated in an exploded view aligned as they would be for convenient storage. In FIG. 5A, the jack plug 510 is shown affixed to a magnet holder 508 in which a magnet 506 is seated. The right speaker assembly 504 and left speaker assembly 502 are conformably configured for alignment and stacking. The attachments between the button, the left speaker, the right speaker, and the jack plug assembly are each magnetic elements with correctly aligned poles enabling them to hold the elements together in an aligned stack, but readily separable for deployment. This allows the garment to be easily removed without interference by dangling cords and wires which cross in front of the garment. The button assembly 550 is worn pinned to the garment for use or temporary storage of the system in a stack configuration.

Figure 5B:
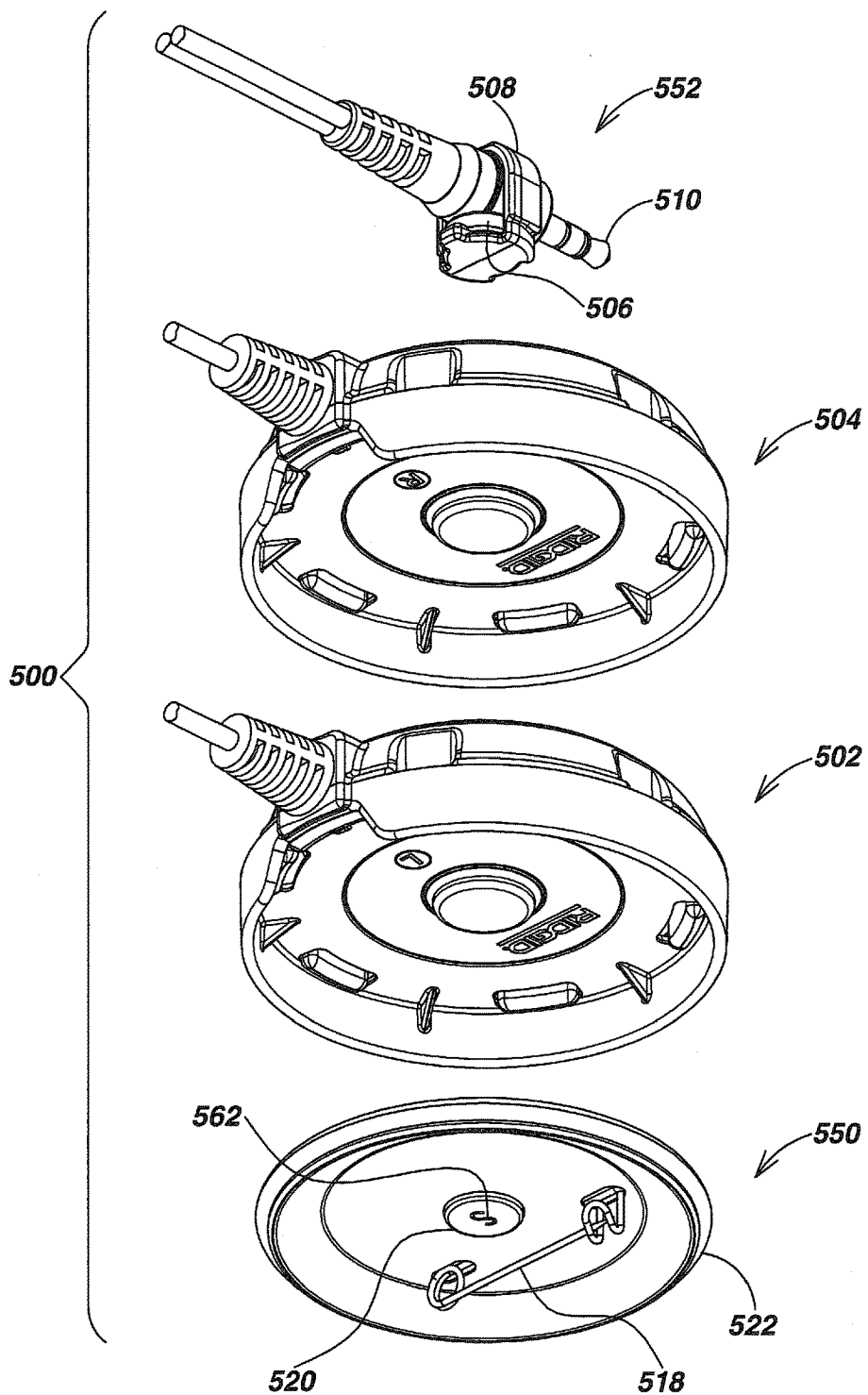
FIG. 5B illustrates the same elements as shown in FIG. 5A, but as seen from below.

FIG. 5B illustrates more clearly the relationship of the button assembly 550 that includes a button 522 and pin 518 with affixed magnet 520, that wholly fits within a receptacle in the form of the left speaker assembly 502. The top of the left speaker assembly 502 fits in similar fashion into the right speaker assembly 504, while the jack plug assembly 552 fits on the top surface of the right speaker assembly 504. Each unit is held by the magnetic attraction between its own magnet (for example, 562) and that of the adjacent unit.

Figure 5C:
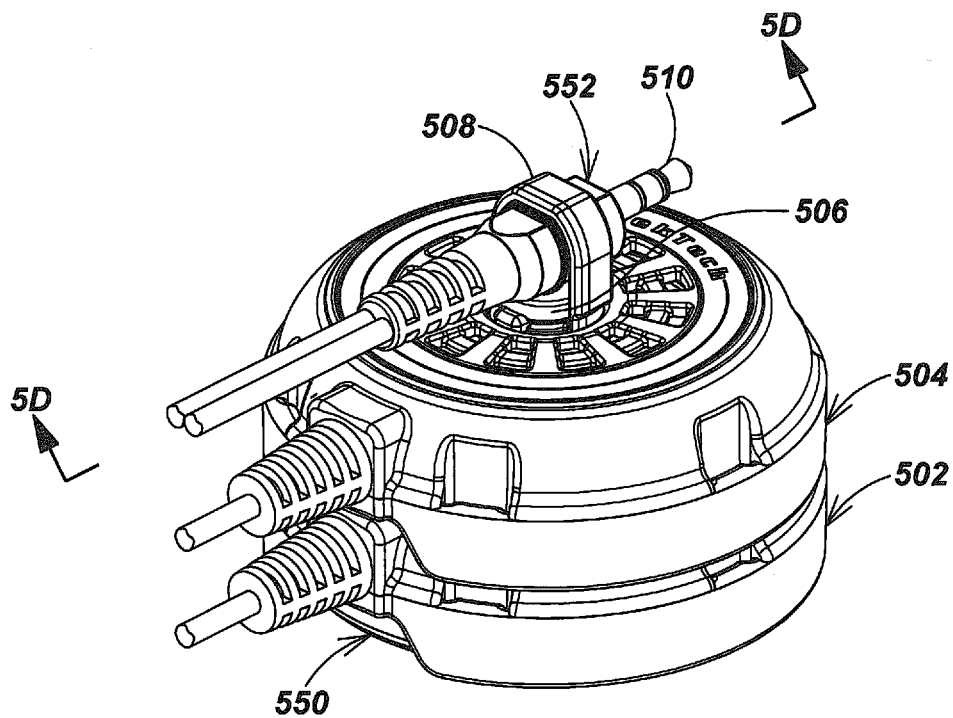
FIG. 5C illustrates the speakers and a cable jack in storage or holding configuration.

Referring now to FIG. 5C, the button assembly 550 magnetically cleaves to the left speaker assembly 502, which similarly magnetically cleaves to the right speaker assembly 504, which in turn magnetically cleaves to the jack plug 510 assembly 552 because of the magnet 506 contained in its magnet holder 508. The polarity of the contained magnets is in each case arranged to allow the units to attract one another, with north and south poles aligned along the vertical central axis of the stack. The speakers could be releasably held together with Velcro snaps, mating mechanical interlocks, or an exterior clasp, for example.

Figure 5D:
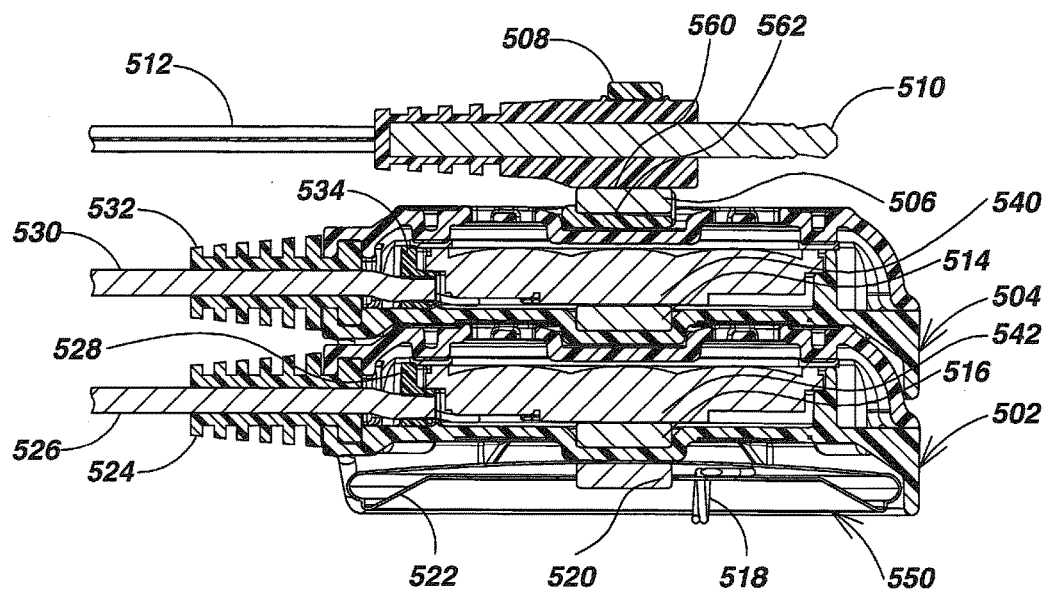
FIG. 5D is a vertical sectional view of the speakers and the elements of FIG. 5A in their self-stacking configuration.

FIG. 5D illustrates the relationship of the jack plug 510 to the top layer, with its magnetic holder 508 and contained magnet 506, showing the north pole 560 and south pole 562 of the included magnet. The end of the straight cord 512 used in this embodiment is illustrated leading to the jack plug 510. The right speaker assembly 504 is illustrated below the jack plug elements in the storage stack. The right speaker cord 530 enters the speaker assembly 504 through a strain relief molding 532. The speaker 540 is illustrated within the assembly. A flexible seal 534 provides water-resistance to the assembly. The right speaker assembly attachment magnet 514 is illustrated affixed within a provided cup in the assembly shell.

In FIG. 5D, the left speaker assembly 502 is below the right speaker assembly 504 in the storage stack. The left speaker cord 526 enters the speaker assembly 502 through a strain relief molding 524. The speaker 542 is shown within the assembly. A flexible seal 528 provides water-resistance to the assembly. The left speaker assembly attachment magnet 516 is affixed within a provided cup in the assembly shell. The button assembly 550 includes a pin-backed button 522 with attachment pin 518, and an attached magnet 520 correctly oriented with respect to polarity.

As can be seen in FIG. 5C and FIG. 5D, the attachment magnets in the several units suffice to hold them together when being worn on a garment in their stacked configuration. The magnets allow the units to be readily separated for deployment. In deploying the speakers the jack plug 510 is connected to a matching receptacle on the locator device. The right speaker assembly 504 is attached to the user's right shoulder or lapel, for example, using the magnetic button assembly attached by pin thereto. The left speaker assembly 502 is then pinned to the user's left shoulder or lapel, for example, using button assembly 550 and pin 518.

Figure 5E:
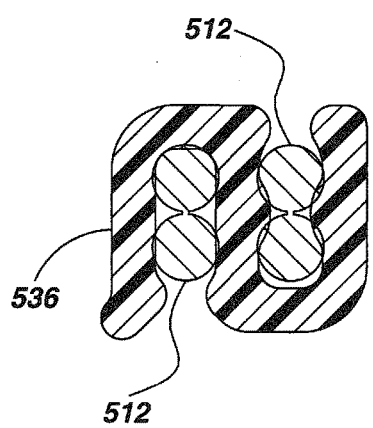
FIG. 5E illustrates a double-C clip which enables an adjustable-length loop formation in the cable.

Turning now to FIG. 5E, a plastic clasp 536 in double-C form is illustrated. The two gripping sections of the clasp 536 each hold a standing part of wire lead 512 from the jack plug 510 in such a way as to hold a segment of the cord 512 in a loop of predetermined size to accommodate any excessive length. Thus, by adjusting the point along the wire 512 at which the wire is grasped by the clasp 536, the loop may be lengthened or shortened, thereby adjusting the length of the wire to the convenience of the user.

Figure 5F:
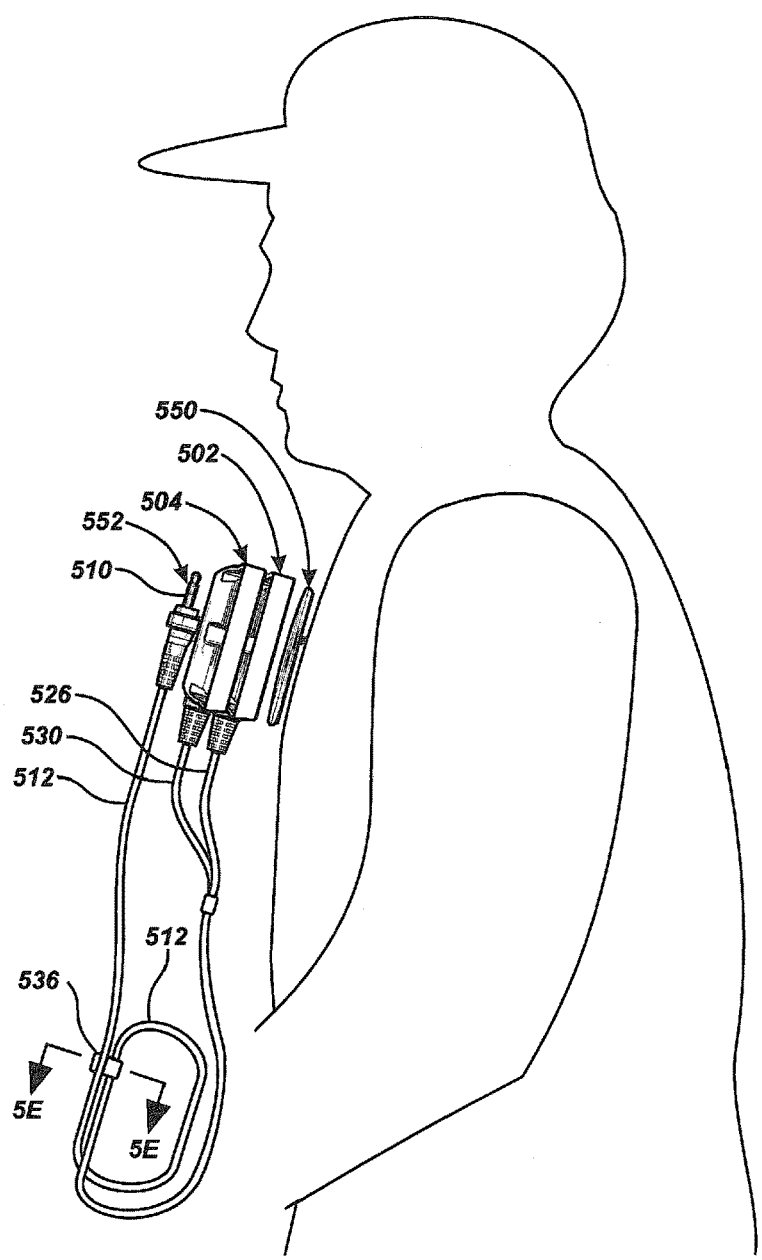
FIG. 5F illustrates the embodiment of FIGS. 1-3 being worn by an operator on a garment in a stacked configuration.

Turning to FIG. 5F, an operator is shown wearing the speaker system in a storage, or stacked, configuration. The button assembly 550 is affixed to the operator's left lapel, as an example. The left speaker assembly 502 is magnetically attached to the button assembly 550. The right speaker assembly 504 is magnetically attached to the left speaker assembly 502. The jack 510 is illustrated resting magnetically attached to the right speaker assembly 504. The two speaker wires 526, 530 form a Y-union, becoming a single wire 512 the standing part of which is clasped at two separate points by clasp 536 forming an adjustable loop as described in connections with FIG. 5D.

Four speakers may be used, attached to the front and back of each shoulder, for example, or elsewhere as suits the operator's needs. The signals supplied to the speakers are controlled by software such that they provide a sense of direction toward the target, or other information, as part of the sound cues.

The man-portable locator can be a tripod locator capable of determining three directional gradients, such directional information being encoded into auditory directional cues which can be presented to the operator appearing from above, below or in any arbitrary three dimensional direction.

The audio system can modify the signal by filtering or selectively delaying, combining, accelerating or enhancing amplitude or phase components of the signal to create a sound field which communicates both left-right and up-down directionality to the operator. Sound amplitude, frequency, and the timbre may be encoded to create a "wrap around sound" effect and to indicate relative strength which can be mapped to distance. Different aspects of the signal (in addition to gradients) can be mapped to directional sound including signal vector angles. Different utilities can be coded with different "voices" so that sound associated with one utility might appear to come from a direction distinct from that of the sound associated with another utility, the sound from both utilities being presented to the operator at the same time.

Instead of transmitting audio bandwidth information, the desired output sound is defined digitally in terms of a desired voice, note, volume and other parameters, and this parametric digital definition of a desired sound can be transmitted instead, the digital instructions being constructed into a desired sound at the speakers through the use of supplementary generating circuits in a manner similar to the well-known Musical Instrument Digital Interface (MIDI) protocol.

Wireless links associated with a mesh network may be used for the transmission of digital sound or digital instructions for the reconstruction of sounds to be output through said speakers. A Bluetooth or Zigbee wireless protocol may be used.

The invention can be implemented with headphones, particularly open headphones, that do not block out ambient sound. Mounting the speakers on the operators shoulder provides an improved sense of directional discrimination and tends not to mask ambient sounds as much as head phones. Therefore, shoulder mounting offers an enhanced degree of safety when working, for example, in traffic.

Clearly, other embodiments and modifications of this invention will occur readily to those skilled in the art in view of these teachings. For example, recent advances in the uses of haptic feedback systems, also known as haptic display, provide an alternative means through tactile feedback of providing an operator with similar directional information through a worn or carried haptic effector device in place of or in addition to speakers. See U.S. Pat. Nos. 5,694,103; 6,111,577; and 6,417,638, the entire disclosures of which are incorporated herein by reference. Therefore, this invention is to be limited only by the following claims, which include all such embodiments and modifications when viewed in conjunction with the above specification and accompanying drawing.

We claim:

1. A buried utility locator system, comprising:
   a portable buried utility locator including a plurality of antenna coils for receiving magnetic field signals from one or more buried utilities, the plurality of antenna coils including:
   a left magnetic field gradient antenna coil;
   a right magnetic field gradient antenna coil; and
   one or more omnidirectional nested magnetic field antenna coils configured to receive magnetic field signals in two or more orthogonal dimensions;
   a locator circuit coupled to an output of the left gradient coil and the right gradient coil to receive and process magnetic field gradient signals emitted from the buried utility;
   a DSP circuit coupled to an output of the locator circuit to generate a plurality of stereophonic audio signals representative of a direction of the locator relative to a buried utility;
   a visual display device coupled to an output of the locator circuitry to provide visual information associated with the depth and position of the buried utility;
   a plurality of audio transducers coupled to an output of the DSP circuit, wherein the plurality of audio transducers include magnetic elements having poles aligned to magnetically hold the plurality of audio transducers in a separable stacked configuration on a user's garment; and
   a cable to detachably couple the plurality of audio signals to the plurality of audio transducers;
   wherein the plurality of audio signals are generated in the DSP to provide a stereophonic sound field providing directional sound corresponding to the position and depth of the buried utility from the audio transducers so as to supplement the buried utility information that is provided visually on the display.

2. The buried utility locator system of claim 1, further comprising a haptic effector coupled the locator to provide haptic output associated with the buried utility depth and/or direction.

3. The buried utility locator system of claim 1, further comprising a sonde, wherein the locator receives magnetic field signals generated by the sonde and wherein the sound field is associated with directional and/or depth information of the sonde relative to the locator.

4. The buried utility locator system of claim 1, wherein the stereophonic sound field is associated with a direction and/or depth of the buried utility relative to the ground surface.

5. The buried utility locator system of claim 4, wherein the direction and/or depth is determined based at least in part on signals provided from the left and right magnetic field gradient antenna coils of the locator.

6. The buried utility locator system of claim 1, wherein the one or more omnidirectional nested magnetic field antenna coils include an upper antenna array comprising three substantially mutually orthogonal nested antenna coils and a lower antenna array comprising three substantially mutually orthogonal nested antenna coils.

7. The buried utility locator system of claim 6, wherein the left and right magnetic field gradient antenna coils are disposed at or near the lower end of the locator, wherein the position is determined based at least in part on signals provided from the gradient antenna coils.

8. The buried utility locator system of claim 1, wherein the DSP provides a right-left fader control to an audio system of the locator for generating the plurality of output signals.

9. The buried utility locator system of claim 1, wherein the plurality of audio output signals are provided simultaneously to the audio transducers from the locator.

10. The buried utility locator system of claim 1, wherein the sound field is based on a signal gradient determined from signals from the left and right magnetic field gradient coils to indicate the directional information.

* * * * *